Jan. 21, 1958   J. J. HOLLOWAY   2,820,689
CAPILLARY PENS
Filed March 18, 1954
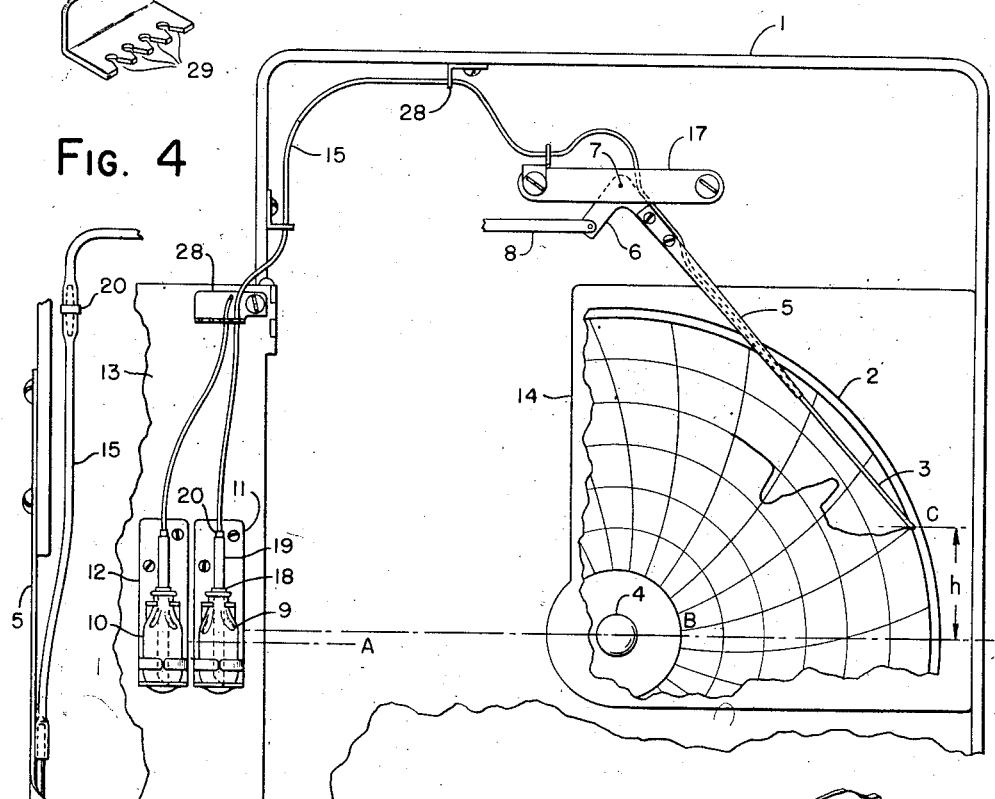
FIG. 4
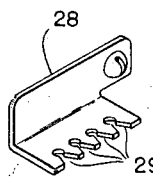
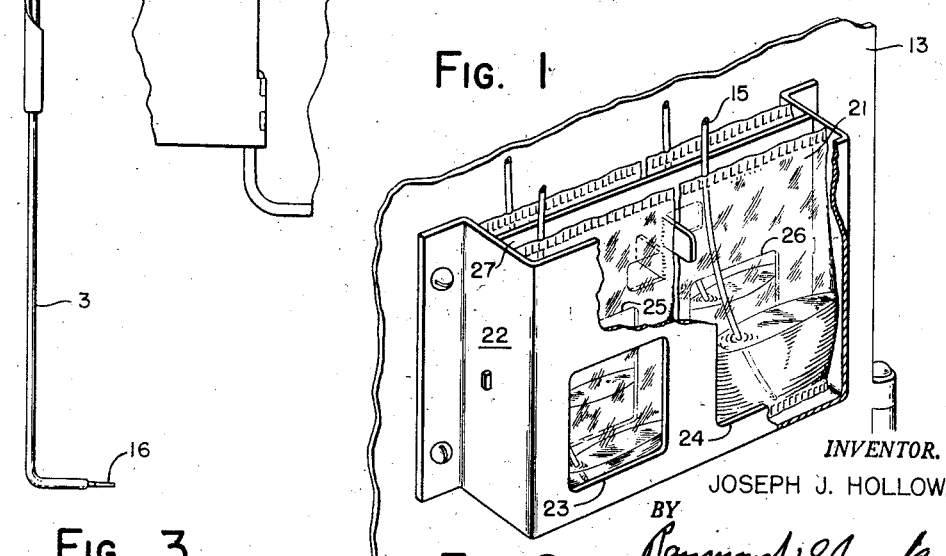
FIG. 3
FIG. 1
FIG. 2
INVENTOR.
JOSEPH J. HOLLOWAY
BY
Raymond D. Junkins
ATTORNEY

2,820,689

CAPILLARY PENS

Joseph J. Holloway, Shaker Heights, Ohio, assignor to Bailey Meter Company, a corporation of Delaware Application March 18, 1954, Serial No. 417,087

6 Claims. (Cl. 346—140)

This invention relates to continuous inking capillary pens for use with recording instruments.

In numerous recording instruments utilizing circular or strip charts it is desirable to provide an inking pen which will make a continuous record on the chart over a sustained period of time, and to provide for such continuous recordings a supply of ink which allows the pen to ink the chart over a considerable period of time without further attention.

One method has been to provide an ink reservoir at or near the pen tip, carried by the pen arm, but this has proven unsatisfactory when a plurality of pens must be nested closely together or when the pen arm presents an extended radius from a pivot to the pen tip. Under such condition, any excessive and varying weight added by an ink supply or reservoir at the pen tip means that the physical force moving the pen arm must be of a sufficient magnitude to position the pen tip over the chart in accordance with the value of a variable. As is well known, the magnitude of such forces available for driving the pen arm may be minute and consequently the less and more uniform the weight at the pen tip the more accurate and responsive the pen will be in recording the variable.

An ink reservoir, located at the pen tip, cannot usually contain more ink than is sufficient for a maximum of a few days, or the weight of the reservoir and contained ink will be excessive. This requires daily inspection and/or filling of the reservoir, a material labor item as well as having the possibility of ink spatter and spilling over the chart and instrument mechanism. Furthermore, such an open pen reservoir is subject to evaporation as well as contamination by dirt. If neglected, the pen tip and reservoir becomes clogged with dirt and gummy ink. In other words, in addition to daily filling of the reservoir, there must be periodic cleaning of both the reservoir and pen tip; a messy job as well as time consuming.

In considering circular charts particularly it is evident that the pen tip must move through a segment or arc upwardly on the chart from the center or zero line, so that 0 to 100 percent of the chart may be utilized. Again, if there is additional and/or varying weight on the pen tip it will be more difficult for the pen and reservoir to be moved through this arc by the mechanism which is sensitive to the variable being measured.

One alternative in avoiding the weight of the ink supply at the pen tip is to provide a stationary ink supply mounted on an instrument casing, and supply the ink to the pen tip by means of a piece of tubing. This supply may be by syphon and capillary action and the tubing must be flexible enough to move in conjunction with the actuation of the pen arm—having enough flexure to avoid offering a resistance to such movement. In addition to the movement required, it is also necessary that the supply of ink be fed continuously to the pen tip as it marks on the chart, for an extended period of time. One means of accomplishing this is through the utilization of capillary action.

The height to which the ink may be lifted from a stationary ink reservoir by capillary action depends upon the sizing of the tubing supplying ink to the pen tip and also the inside diameter of the pen tip. Additionally, if the ink supply reservoir is a rigid structure such as a glass bottle, the ink placed therein will be subject to a drying action from exposure to the atmosphere. This not only causes a loss of ink but the ink remaining in the bottle becomes progressively thicker until it will no longer feed. This drying action can be retarded somewhat by placing a cap over the bottle serving as the ink reservoir, but in order for the ink to feed continuously through the tubing to the pen tip by capillary action a breather tube must be placed in the cap of the ink reservoir to prevent the occurrence of a negative pressure within the bottle (as the ink is drawn from the bottle) which tends to overcome the capillary action thus stopping the ink supply.

Metal tubing has been used as the supply tubing from such a stationary ink reservoir to the pen tip but it is relatively difficult to obtain the desired flexibility needed in the tubing, and I have found that a plastic tubing is far more satisfactory.

Another problem which occurs with continuous feed capillary pen structures is that ambient temperature variations may cause a loss of moisture from the ink through the tubing by diffusion as well as infusion of gases through the tubing to its interior thus forming gas pockets which stop the capillary flow of the ink. If the ink supply is exposed to the atmosphere at higher ambient temperatures—from 80 to 100° F.—such exposure will cause more rapid drying or loss of moisture from the ink in the reservoir thus thickening it and also preventing the continuous flow of the ink to the pen tip.

It is therefore an object of my invention to provide a continuous inking capillary pen structure which has tubing of sufficient flexibility to allow a pen arm to be actuated in accordance with minute forces, either mechanical or pneumatic, representative of the variable.

It is another object of my invention to provide a flexible sealed ink reservoir to prevent the drying of the ink within.

It is a particular object of my invention to provide a capillary pen structure which is not affected by ambient temperature variations, utilizing a plastic ink reservoir and tubing which resists moisture absorption and gas infusion.

It is a particular feature of my invention to provide, as an article of manufacture, a continuous feed capillary pen system of the "closed" system type, i. e., with a sealed ink reservoir for protecting the freshness of the ink being practical, when a material is used which is highly resistant to diffusion of air and water vapor, for both ink sac and the feed tubing.

I preferably construct the ink reservoir and capillary tubing of Saran plastic, a trademark of the Dow Chemical Company for a series of vinylidene chloride copolymers.

A further feature of my invention is to construct the ink reservoir of a plastic material such as Saran which allows the ink reservoir to tend to expand or collapse with barometric pressure and temperature changes and at the same time presents an air tight reservoir for the ink, and further, the flexible nature of the ink sac allows for the starting of the capillary action in the capillary tubing by exerting a squeezing pressure on said sac. Such flexibility of the sac is also useful in purging the capillary tubing should it become clogged or air-bound for any reason.

Other features and advantages of my invention will appear in the description and in the appended claims.

In the drawings:

Fig. 1 is a somewhat diagrammatic showing of a portion of a recording instrument having a circular chart and a capillary pen continuous inking structure marking on said chart.

Fig. 2 is a detailed showing of a form of flexible ink reservoir and a support therefor.

Fig. 3 is a side elevation of the recording pen with appropriate connections to the capillary tubing.

Fig. 4 is an isometric of a support for the capillary tubing.

Referring now to Fig. 1, a portion of a recording instrument casing 1 is shown with a section of a circular recording chart 2 adapted to be rotated by a clock means (not shown). A pen stylus 3 is shown in its maximum lifted position at a height $h$ from a center line running through the chart center 4. In this illustration the stylus 3 and pen tip is shown at 100% of chart travel.

The pen stylus 3 is carried by pen arm 5 which is shown affixed to a bell crank 6, the latter pivoted at 7 on a support member 17, said bell crank 6 being adapted to be positioned by linkage member 8 upon actuation of the member by a means (not shown) responsive to a variable such as temperature, pressure, or the like, or by a fluid pressure receiving device such as is disclosed and claimed in the copending application of Michael Panich S. N. 408,725 filed February 8, 1954, now Patent No. 2,805,682, issued September 10, 1957.

In Fig. 1 the ink supply for the recording pen is contained in a sealed pliable sac 9. As more than one pen may be mounted in the instrument casing, an additional pliable ink reservoir 10 is shown to indicate the arrangement of container sacs 9 and 10 in support members 11 and 12 respectively, mounted on a hinged door member 13 which recesses into an opening adjacent instrument plate 14. The ink in sac 9 is supplied to the pen stylus 3 and the pen tip 16 through flexible plastic tubing 15 and is sustained by capillary action. In regard to capillary action it is to be noted that the maximum ink level A in the sacs 9 and 10 is approximately ⅛ inch below the center line of the chart. Sufficient capillary action must be provided so that the pen stylus 3 can move between points B and C, over chart 2 (a vertical distance $h$) without loss of capillary flow. The ink level in the reservoirs must be kept at or below level A to prevent flooding of the ink from pen tip 16 by syphon action.

Assuming a pen tip inside diameter of substantially .008 inch, then a maximum ink rise, pen tip above ink level, for consistent operation may be in the neighborhood of 3 inches. To avoid syphon action the maximum ink level in the sac 9 must never be higher than the lowest point B of pen tip travel. The mentioned rise of 3 inches covers approximately 2 inches for the dimension $h$ with one inch decline for ink level with use from the sac 9.

In the particular construction shown in Fig. 1, the ink reservoir 9 is sealed from the atmosphere by means of washer 18 and reservoir tube 19 both fitting tightly in the neck of sac 9 to exclude any air from its interior. Capillary tube 15 may be inserted in reservoir tube 19 with a close fit or use may be made of a small metallic connector 20. As viewed in Fig. 1, the reservoir tube 19 can be seen extending to the lower inner portion of ink sac 9 so that substantially all of the ink of the sac will be drawn therefrom.

Under certain conditions of ambient temperature and pressure it is feasible to make the sac 9 of latex or other rubber materials or of a flexible plastic. With such a flexible walled sac 9 it may be squeezed or compressed inwardly by an operator to force the ink through the capillary tube 15 until it starts to flow from the pen tip 16. Therefore such flexible sac 9 affords a simple means for purging the capillary pen and tubing should it become clogged by small particles of foreign matter, and for initially starting the capillary flow.

A suitable plastic used in the arrangement of Fig. 1 for ambient temperatures below approximately 75° F. may be a plastic like polyvinyl chloride-acetate, the tubing 15 having an inside diameter of .040 inch and a wall thickness of .010 inch, and the ink sac 9 can be made of latex or rubber with a thickness not to exceed .003 inch.

I have mentioned that a change in ambient temperature of quite wide extent may be experienced, and referring now to Fig. 2 I have shown therein an ink sac structure made of Saran (trade-mark of the Dow Chemical Company for polyvinylidene chloride plastics) plastic with the capillary tube 15 also made from the same plastic, with the tubing connected to pen stylus 3 as shown in Figs. 1 and 3. Saran plastic was chosen for the capillary tubing and reservoir preferably because it was determined that such plastic is satisfactory for operation in capillary pen structure up to ambient temperatures of 150° F. It was determined that the polyvinyl chloride tubing mentioned in conjunction with Fig. 1 was not satisfactory in ambient temperatures over approximately 80° F. for water from the ink in the tubing would be absorbed by the tubing and the gases would infuse through the tubing to form gas pockets in the tubing thus preventing the capillary flow of ink. Thus I have found that, for widely varying ambient temperatures, the most satisfactory material for the flexible ink reservoir and the capillary tubing is Saran plastic.

For sufficient flexibility of the tubing it is necessary that the Saran plastic tubing have a wall thickness of .005 to .010 inch with a bore of .010 to .025 inch. The Saran plastic of which the ink reservoirs 21, shown in Fig. 2, is made is obtained as a flat tubing about 1½ inches wide of .001 to .003 inch thickness and is transparent. The reservoir sac 21 is thus of envelope shape approximately 1½ inches wide by 2¼ inches high and is heat sealed at each end (after ink filling) by electronic induction equipment on a bar sealer. The sac is transparent and, before the uppermost edge is sealed or welded, the tubing 15 is inserted downwardly to near the bottom of the sac. The welding of the upper edge of the sac 21 then seals the tubing 15 to the sac closure.

An article of manufacture is thus constructed consisting of the reservoir sac 21 to which is sealed the proper length of plastic tubing 15. The sac contains the proper amount of ink and the outermost end of tubing 15 is heat sealed for shipment. Experience has shown that, when properly placed in operation, the capillary pen-reservoir system contains sufficient ink for approximately 6 months continuous operation at which time the ink will be substantially exhausted from the sac 21 and then the complete sac tubing assembly is replaced with a new one. In the meantime, the ink has not become contaminated with dirt or gases nor has it gained or lost any moisture content.

Referring specifically to Fig. 2 it can be seen that a plurality of flexible plastic ink reservoirs 21 are shown placed in a supporting structure 22. Sealed within plastic reservoir 21 is the end of flexible plastic tubing 15. Supporting structure 22 is shown mounted on the hinged door 13, with the capillary tubing 15 adapted to be connected to pen stylus 3 in the manner shown in Figs. 1 and 3. The particular embodiment shown in Fig. 2 indicates how four such pens could be supplied by four flexible plastic ink reservoirs and preferably the ink would be of different colors in the different reservoirs for the different pens. The supporting structure 22 is provided with two window openings 23 and 24 so that the ink level within the transparent flexible ink reservoirs can be viewed readily by the operator. In addition, supporting structure 22 is open at the top so that the flexible ink reservoirs in the foreground, as viewed in the drawing, can be lifted up by the operator allowing a view of the ink levels of the ink reservoirs nearest to hinged member 13. Through windows in a dividing member 27 sufficient space is provided between the dividing member 27 and the outer walls of the supporting structure 22 so that the flexible ink reservoirs may easily assume the filled position as shown in the drawing. In other words the weight of the individual sac 21 rests upon the bottom of support 22 and the weight of the contained ink bulges the sides of the sac sufficient to gain support from the interior walls of parts 22 and 27. This prevents any tear-drop shape forming of the sac 21 with danger of strain upon the sac wall.

Fig. 3 shows an enlarged view of the manner of connecting pen arm 5 to pen stylus 3 with associated pen tip 16. The flexible capillary tubing 15 is disclosed as being slipped over the outer periphery of pen stylus 3. A metal connector 20 is shown to provide an intermediate connection should it be desirous to replace only a section of capillary tubing 15 and flexible ink reservoir 21, or the reservoir shown at 9 or 10 as the case may be, rather than replacing the entire length of capillary tubing 15.

Fig. 4 shows a tubing support member 28 with indentations 29 shaped in such manner that the tubing may be slipped into the V-notched portion of the indentation which has a slightly smaller necked dimension than the outside dimension of the tubing and then into the circular section being of about the same diameter as the outside diameter of the tubing to allow a mere supporting action of the tubing 15 without a substantial gripping thereof.

With this improved article of manufacture the latex or plastic ink sacs can be shipped with several inches of tubing integral therewith and the tubing sealed. To replace an ink sac it is only necessary to pull away the old sac and accompanying tubing from the capillary tubing within the meter case and replace it with the new tube and sac structure and snip off the sealed end of the tubing. The sealed ink sac means that the reservoir will be at the same atmospheric condition that exists at the pen tip and that the sac will fluctuate with atmospheric conditions. The flexibility of the walls of the reservoir sac allows it to in effect "breathe" inwardly or outwardly with barometric pressure and temperature changes. It is not necessary to change the position or location of the ink reservoir sac or its support to maintain a continuous flow of ink so long as the original location is with the highest ink level below the lowest pen travel point to prevent syphon action.

It is desired that these plastic sacs collapse completely as the ink is withdrawn through the capillary so that it will be unnecessary to admit air to the interior of the sac as would be the case with a rigid reservoir such as the glass bottle first mentioned. Air, of course, oxidizes the ink and aside from the initial amount sealed into the sac with the ink, no further air is introduced. Thus, if desired, a much quicker drying ink may be used and a great many problems of chart recording obviated. Usually the sac or container is filled about ½ full of ink and the variables of temperature and pressure do not affect the flow of ink through the capillary to the pen point. The varying level of ink in the reservoir does not affect the flow out of the capillary pen point. Furthermore, the collapsible ink sac reservoir can always be lightly squeezed to start ink flowing or to force ink out through the capillary to clear the same of any dirt or clogging that might occur.

These Saran ink sacs are very strong and can easily be squeezed hard enough to create the necessary pressure for cleaning out the capillary and pen tip, without any danger of bursting them. At the same time they may be shipped and handled readily without any danger of breakage. The flexibility is retained substantially unchanged through normal variations in ambient temperature and other conditions. This material seems, at present, to offer the highest resistance (with desirable pliability) to infusion of gases or diffusion of moisture from the ink. The two-inch inside height dimension recommended is only about half used up by the 5 cc. quantity of ink which is estimated for a 4–8 months supply, the additional height being solely for the purpose of making a larger sac, the sides of which will move in and out more easily than a small sac of similar stiffness of material. By supporting both the top and sides of the ink sac 21 this keeps it from sagging. It is confined in a narrow rectangular holder as shown.

What I claim as new and desire to secure by Letters Patent of the United States, is:

1. In a recording apparatus utilizing a recording pen movable over a recording chart, a sealed recorder unit comprising an elongated pen stylus having a pen tip at one end and having pivotal mounting means at the other end, an elongated, pliable ink reservoir sac of synthetic plastic material having high resistance to inward diffusion of ambient atmospheric gases and outward diffusion of moisture, liquid recording pen ink partially filling said reservoir sac, and a pliable capillary tube of synthetic plastic material extending from the said liquid recording ink in the lower inner portion of said sac and in integrally sealed relation and outwardly through the opposite end portion of the ink reservoir sac, and another length of said capillary tube detachably connected with the portion of the capillary tube extending from the ink reservoir sac, and extending in uncoiled condition from its connected end to the end of the pen stylus remote from the tip.

2. In a recording apparatus having a plurality of recording pens pivotally mounted for movement over a common recording chart, each of said pens including a stylus with a pen tip at its unpivoted end, the combination comprising a rectangular support structure having a front wall, a back wall, side walls, and a bottom wall, the top of said structure being open, a spacer element extending parallel to the side walls and defining therewith a pair of vertical compartments accessible from the top, and a pliable, sealed, rectangular reservoir sac of transparent synthetic plastic material containing liquid recording ink and having the width of the vertical compartments fitted in each of said compartments, each of said sacs hving a capillary tube extending from the inside thereof through its upper end in sealed relation therewith for discharge of ink and removal of the sac, and the front wall having spaced apertures arranged for examining the respective sacs.

3. The apparatus as defined in claim 2 in which an intermediate dividing wall extends in spaced parallel relation between the front and back walls and is provided with spaced apertures so positioned that additional reservoir sacs fitted in the space between the intermediate and back walls may be examined without removal by elevating the reservoir sacs in the space between the front wall and the intermediate wall.

4. An ink supply system for use with capillary recording pens and comprising an elongated, pliable reservoir sac of synthetic plastic material of envelope shape and high resistance to inward diffusion of ambient atmospheric gases and outward diffusion of moisture, liquid recording pen ink partially filling said sac, and a capillary tube of synthetic plastic material extending from the liquid ink in the lower inner portion of said sac and through the upper edge portion of the sac in sealed relation, the outermost end of the capillary tube being integrally sealed for shipment.

5. The system as defined in claim 4 in which the synthetic plastic material is composed of transparent vinylidene chloride copolymers, the thickness of the sac material is 0.001 to 0.003 inch, and the capillary tube has a wall thickness of 0.005 to 0.010 inch and a bore of 0.010 to 0.025 inch.

6. The system as defined in claim 4 in which the reservoir sac and the capillary tube are composed of synthetic plastic material, the thickness of the sac material is 0.001 to 0.003 inch, and the capillary tube has a wall thickness of 0.005 to 0.010 inch and a bore of 0.010 to 0.025 inch.

References Cited in the file of this patent

UNITED STATES PATENTS

| | | |
|---|---|---|
| 1,099,344 | Desenberg et al. | June 9, 1914 |
| 1,281,134 | Clarke | Oct. 8, 1918 |
| 2,026,657 | Sherman | Jan. 7, 1935 |
| 2,176,777 | Tate | Oct. 17, 1939 |
| 2,646,336 | Edinburg | July 21, 1953 |
| 2,702,034 | Walter | Feb. 15, 1955 |
| 2,800,385 | Cannon | July 23, 1957 |

U. S. DEPARTMENT OF COMMERCE
PATENT OFFICE

CERTIFICATE OF CORRECTION

Patent No. 2,820,689                                January 21, 1958

Joseph J. Holloway

It is hereby certified that error appears in the printed specification of the above numbered patent requiring correction and that the said Letters Patent should read as corrected below.

Column 6, line 63, after "in" insert -- integrally --; line 64, after "being" strike out -- integrally --.

Signed and sealed this 15th day of April 1958.

(SEAL)
Attest:
KARL H. AXLINE
Attesting Officer

ROBERT C. WATSON
Commissioner of Patents